(12) United States Patent
Miller et al.

(10) Patent No.: US 7,584,925 B2
(45) Date of Patent: Sep. 8, 2009

(54) LIGHTWEIGHT AIR VEHICLE AND PNEUMATIC LAUNCHER

(75) Inventors: Stephen W. Miller, Cockeysville, MD (US); Matthew Velazquez, Owingsmills, MD (US)

(73) Assignee: AAI Corporation, Hunt Valley, MD (US)

( * ) Notice: Subject to any disclaimer, the term of this patent is extended or adjusted under 35 U.S.C. 154(b) by 0 days.

(21) Appl. No.: 11/877,201

(22) Filed: Oct. 23, 2007

(65) Prior Publication Data
US 2008/0093501 A1    Apr. 24, 2008

Related U.S. Application Data

(62) Division of application No. 10/509,659, filed as application No. PCT/US2004/04720 on Feb. 19, 2004, now Pat. No. 7,410,124.

(60) Provisional application No. 60/448,472, filed on Feb. 21, 2003.

(51) Int. Cl.
*B64C 3/56* (2006.01)
*B64F 1/04* (2006.01)
(52) U.S. Cl. .......................... 244/49; 244/3.28; 446/62
(58) Field of Classification Search ............... 244/3.27, 244/3.29, 49, 3.28, 63; 446/57, 62, 63
See application file for complete search history.

(56) References Cited

U.S. PATENT DOCUMENTS

| 988,611 | A | | 4/1911 | Wilson |
| 2,315,242 | A | | 3/1943 | Briggs et al. |
| 2,417,267 | A | * | 3/1947 | Porter .......................... 446/62 |
| 2,512,069 | A | * | 6/1950 | Mull ............................ 446/62 |
| 3,118,242 | A | | 1/1964 | Snyder |
| 4,106,727 | A | * | 8/1978 | Ortell .......................... 244/49 |
| 4,697,523 | A | | 10/1987 | Saxby et al. |
| 5,193,517 | A | | 3/1993 | Taylor et al. |
| 5,769,066 | A | | 6/1998 | Schneider |
| 5,819,717 | A | | 10/1998 | Johnson et al. |
| 6,321,737 | B1 | | 11/2001 | Johnson et al. |

OTHER PUBLICATIONS

Sentry HP, "Next generation Sentry air vehicle with additional payload capacity and enhanced performance characteristics," http://www.drs.com/products, printed May 22, 2007.

* cited by examiner

*Primary Examiner*—Rob Swiatek
(74) *Attorney, Agent, or Firm*—Venable LLP; Cameron H. Tousi

(57) ABSTRACT

A portable unmanned air vehicle and launcher system that includes a foldable unmanned air vehicle having a pressure tube; a launch gas reservoir for holding launch gas; a launch tube operatively connected to the launch gas reservoir and having a free end that is positioned in the pressure tube of the air vehicle; a free piston positioned within the launch tube; and a free piston stop to prevent the free piston from leaving the launch tube. A first portion of the launch gas in the launch gas reservoir is released into the launch tube and forces the free piston from an initial position to an end position at which the free piston is stopped by the free piston stop.

4 Claims, 6 Drawing Sheets

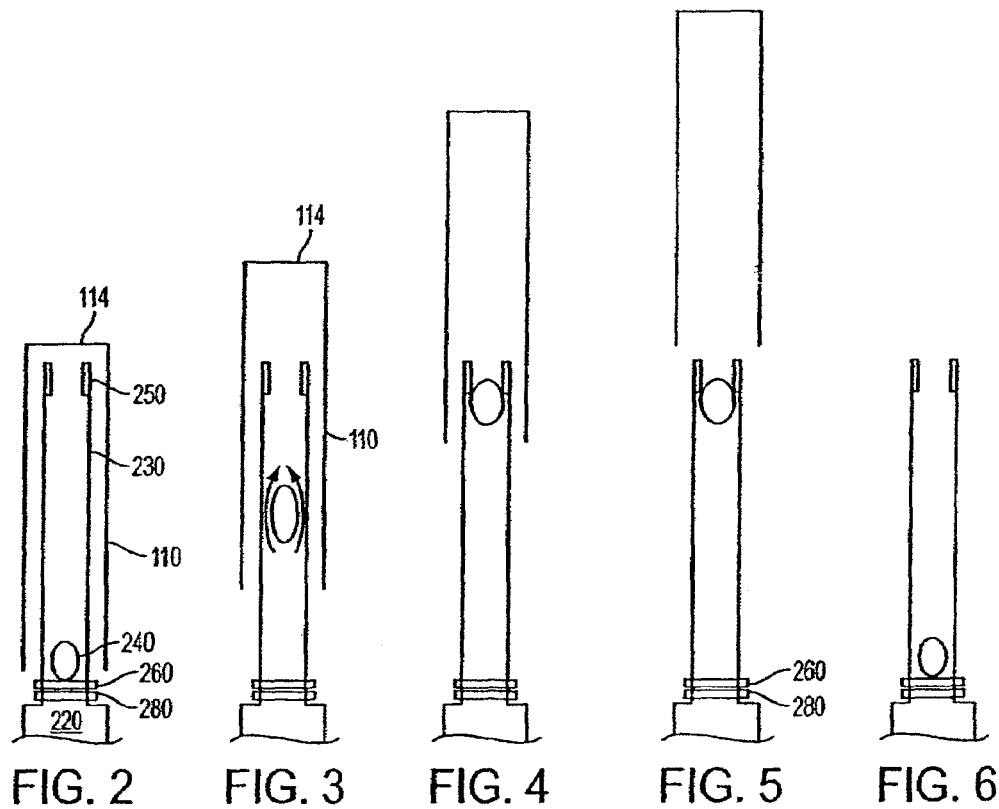

LIGHTWEIGHT AIR VEHICLE AND PNEUMATIC LAUNCHER

This application is a divisional of U.S. patent application Ser. No. 10/509,659, filed Jun. 29, 2005, claims priority to U.S. Provisional Patent Application No. 60/448,472, filed Feb. 21, 2003, the entire contents of which are incorporated herein by reference.

BACKGROUND OF THE INVENTION

The present invention relates generally to lightweight air vehicles and launchers used for lightweight air vehicles, and more particularly to unmanned aerial vehicles and pneumatic launchers therefore.

Lightweight unmanned air vehicles are becoming very popular for various uses including surveillance and package delivery in military and law enforcement situations. Methods for making these UAVs smaller and lighter are needed to improve system transportability. Methods for making them easier to use are needed to improve reliability. Methods for launching UAVs with minimal signature by making them quick and quiet to launch from a very limited space are needed to enable covert operation. There is a need, particularly in military applications, for a transportable, reliable and low signature UAV and launching system that can be carried by one person.

BRIEF SUMMARY OF THE INVENTION

The invention provides a lightweight UAV and a system for launching the UAV that is compact and lightweight so that, for example, a soldier can easily carry the system as a backpack.

The invention incorporates design features and approaches that are more transportable and reliable and are less detectable than conventional methods. Transportability is achieved by the small size and low weight of the design as well as a protective tube packaging approach. A lightweight materials and structural approach has been used to achieve the small size and low weight. A heavy and complicated launcher is not needed. The outer tube of the launcher is also used as a protective transport tube. This tube, which totally encloses the air vehicle, prevents damage to the light aircraft structures when transported along with other military equipment and supplies to and from the theater of operations.

Reliability has been achieved by the invention by reducing the reliance on skilled and trained operators. Conventional small UAVs are transported in pieces and assembled when needed. The invention is transported fully assembled and does not suffer reliability problems associated with lost, broken or improperly assembled individual components. Conventional small UAV launcher methods involve procedures and technologies that personnel must perform correctly to achieve a successful launch. Often the launch is unsuccessful which can damage the air vehicle. The invention involves a launch method that can be performed correctly with significantly less training.

Signature reduction is achieved by a packaging approach, tube launch design and pneumatic launch design features. The packaging approach eliminates the need for air vehicle assembly at the launch location. As a result, the activity of unpacking and assembling the air vehicle is not needed and, therefore, can not be detected. The tube launch design requires very little space to operate. Conventional small UAV launch techniques can require a small field for launching while the invention can launch the UAV from minimal space such as, for example, within the confines of a small bush. The noise reduction design features eliminate the loud popping sound associated with conventional pneumatic launch methods.

In some embodiments, a hold back mechanism is used to retain the air vehicle on a launch tube when a launch gas reservoir and the launch tube are charged with pressurized gas. When the hold back mechanism is released, the air vehicle is propelled off of the launch tube by the pressurized gas. A free piston in the launch tube allows the air vehicle to be ejected while blocking the exhaust of remaining gas from the pressurized reservoir, thus greatly reducing the noise created during launch.

Embodiments of the invention provide a launcher for launching a foldable unmanned air vehicle having a pressure tube, the pressure tube being open at a rear end and closed at a front end. The launcher including a launch gas reservoir for holding launch gas; a launch tube operatively connected to the launch gas reservoir and having a free end for inserting into the open end of the pressure tube of the air vehicle; a free piston positioned within the launch tube; and a free piston stop to prevent the free piston from leaving the launch tube. A first portion of the launch gas in the launch gas reservoir is released into the launch tube and forces the free piston from an initial position to an end position at which the free piston is stopped by the free piston stop. The movement of the free piston from the initial position toward the end position in the launch tube occurs as the air vehicle launches.

Other embodiments of the invention provide a portable unmanned air vehicle and launcher system. The system including a foldable unmanned air vehicle having a pressure tube, the pressure tube being open at a rear end and closed at a front end; a launch gas reservoir for holding launch gas; a launch tube operatively connected to the launch gas reservoir and having a free end that is positioned in the pressure tube of the air vehicle; a free piston positioned within the launch tube; and a free piston stop to prevent the free piston from leaving the launch tube. A first portion of the launch gas in the launch gas reservoir is released into the launch tube and forces the free piston from an initial position to an end position at which the free piston is stopped by the free piston stop. The movement of the free piston from the initial position toward the end position in the launch tube occurs as the air vehicle launches.

Other embodiments of the invention provide a foldable unmanned air vehicle including a fuselage having a pressure tube portion for receiving a launch tube of a pneumatic launcher; two wings, each wing being pivotably connected to the fuselage such that it pivots about a pivot point; a wing retention mechanism that holds the wings in a folded position; a foldable tail connected to the fuselage; a tail retention mechanism that holds the tail in a folded position; and a linkage that links the wing retention mechanism to the tail retention mechanism such that release of one of the tail retention mechanism and the wing retention mechanism releases the other of the tail retention mechanism and the wing retention mechanism.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of preferred embodiments of the invention, as illustrated in the accompanying drawings wherein like reference numbers generally indicate identical, functionally similar, and/or structurally similar elements.

FIGS. 2-6 are schematic views of various stages of launching in accordance with an embodiment of the invention;

DETAILED DESCRIPTION OF THE INVENTION

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without parting from the spirit and scope of the invention.

The invention provides a lightweight, unmanned air vehicle and a launcher for the air vehicle that can be carried by a single person in, for example, a battlefield situation. The air vehicle and launcher form a compact, lightweight unit that is durable and easily deployed by a single person. The system launches the air vehicle with minimal noise, making the system particularly appropriate for stealth, covert operations. The extremely low noise levels generated by launching are achieved by containing most of the gas used to launch the vehicle within the system and, thereby, substantially eliminating the gas release noise common with pneumatic launch mechanisms.

Figure 1:
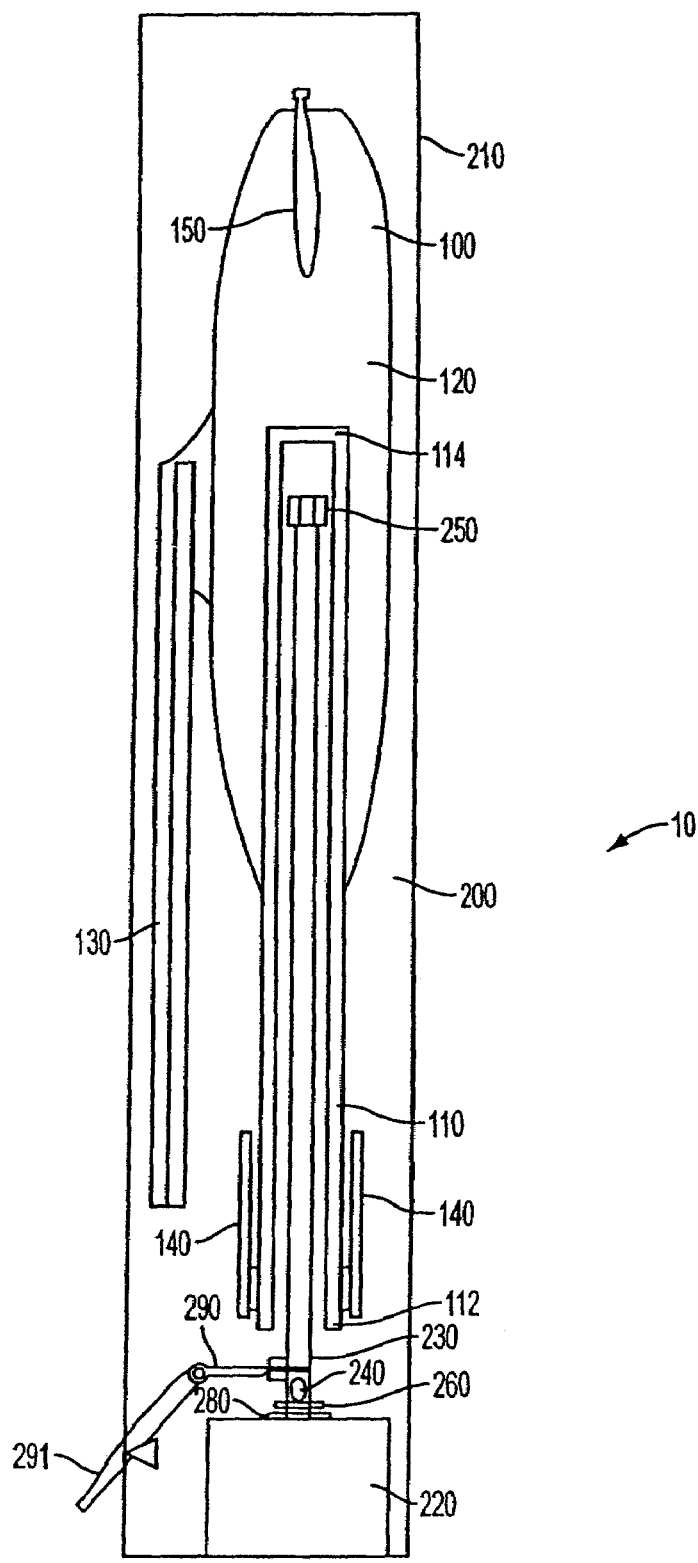
FIG. 1 is a schematic sectional view of an air vehicle and launcher in accordance with an embodiment of the invention.

FIG. 1 shows an example of a system 10 in accordance with the invention. System 10 includes an air vehicle 100 and a launcher 200. Air vehicle 100 has a pressure tube 110 that, in this example, forms a portion of a fuselage 120 of air vehicle 100. Air vehicle 100 has, in this example, two wings 130 that are folded while air vehicle 100 is in launcher 200. A tail 140 is also shown schematically at the rear end of air vehicle 100. A folded propeller 150 is also provided in this example. In preferred embodiments, an quiet, electric motor is used to power the propeller.

Pressure tube 110 has an open end 112 and a closed end 114. Pressure tube 110 receives a launch tube (discussed below) of launcher 200 and is the interface of energy transfer between launcher 200 and air vehicle 100.

Launcher 200 has a tube 210 that provides an enclosure for the launcher components and air vehicle 100. Launcher 200 has a launch gas reservoir 220 that stores a gas used to launch air vehicle 100. Appropriate gases include, but are not limited to, air, nitrogen and helium. Attached to launch gas reservoir 220 is a launch tube 230 that extends into pressure tube 110 of air vehicle 100. A free piston 240 is located inside launch tube 230 and is permitted to slide freely between an end stop 250 and a stop pin 260. A valve 280 may be provided to allow an operator control over when gas is permitted to pass from launch gas reservoir 220 to launch tube 230.

A hold back mechanism 290 can be used to hold the air vehicle onto launch tube 230 when gas pressure is applied to launch tube 230. A trigger release mechanism 291 can be provided to release hold back mechanism 290.

An example of a launch sequence is shown in FIGS. 2-6. FIG. 2 is a simplified view of the system immediately prior to launch (similar to FIG. 1). With hold back mechanism 290 engaged, pressurized gas filling launch gas reservoir 220 will be applied to launch tube 230 and free piston 240. FIG. 3 is a view of the system shortly after hold back mechanism 290 is activated and launch gas is allowed to transfer from launch gas reservoir 220 to launch tube 230. In this view, air vehicle 100 (schematically represented by pressure tube 110) has moved relative to launch tube 230 under the force exerted on closed end 114 of pressure tube 110 by the launch gas that has moved from launch tube 230 into pressure tube 110. The arrows in FIG. 3 represent launch gas moving around free piston 240 through spaces between free piston 240 and the inside wall of launch tube 230. The size and number of these spaces is important to properly regulate the amount of launch gas that passes by free piston 240 during the launch procedure. If the spaces allow too much launch gas to pass by free piston 240, the result will be excessive gas loss which will result in an undesirable noise signature. In the extreme case, the entire volume of launch gas could be lost, creating the maximum noise signature. If the spaces are too restrictive and allow too little launch gas to pass by free piston 240, free piston 240 could block the open end of launch tube 230 before air vehicle pressure tube 110 clears launch tube 230. When this happens, the launch energy is isolated from air vehicle 100 and launch performance (velocity) is reduced.

FIG. 4 shows free piston 240 at rest against end stop 250 of launch tube 230 and pressure tube 110 preceeding further away from launch tube 230. When free piston 240 is in this position, it is pressed against, and forms a seal with, end stop 250 to prevent any further launch gas from escaping from the system. FIG. 5 shows pressure tube 110 clearing the end of launch tube 230. At this point, air vehicle 100 will be clear of, or almost clear of, tube 210 of launcher 200. After the launch is complete, free piston 240 has sealed most of the pressurized gas from escaping the system.

To reuse the launcher, the operator has several options depending on the design features included in the launcher. In the simplest launcher design, the pressurized gas is vented to the atmosphere using a venting needle valve located, for example, between launch gas reservoir 220 and launch tube 230. Once the gas is vented, free piston 240 releases from end stop 250 and an air vehicle can be installed and latched in position using hold back mechanism 290. To execute another launch, the launcher may need to be charged by an external pressure source. If the launcher is equipped with a valve 280, this can be closed off. Pressure inside launch tube 230 is vented to allow free piston 240 to fall to the pre-launch position. This venting can be accomplished by several methods, including: (1) a vent valve located between valve 280 and launch tube 230; (2) a slow leak like a pin hole in free piston 240 which would slowly vent the chamber; or (3) a vent valve located in free piston 240 that could be manually activated to vent the chamber. Once launch tube 230 is vented, another air vehicle can be mounted. A small boost charge from an external pressure source may be required. If the launcher is not equipped with valve 280 and venting is not desired (since it wastes pressurized gas), a vent valve located in free piston 240 and a small pin device located inside pressure tube 110 can be used. During engagement of hold back mechanism 290, the pin could push the vent valve in free piston 240 allowing free piston 240 to unseal and fall to the pre-launch position. A small boost pressure charge from an external pressure source may be required to restore full launcher performance.

Figure 7:
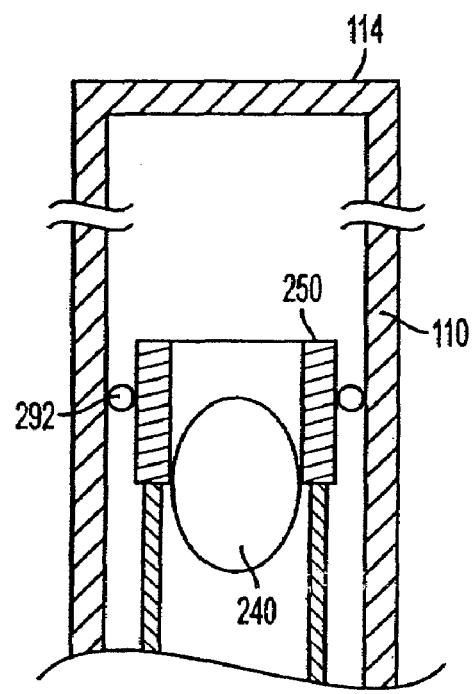
FIG. 7 is a partial sectional view of a detail in accordance with the invention.

FIG. 7 shows a larger scale view of free piston 240 forming a seal with end stop 250 as described above in reference to FIG. 4. An optional seal 292 is shown between end stop 250 and pressure tube 110.

Figure 8:
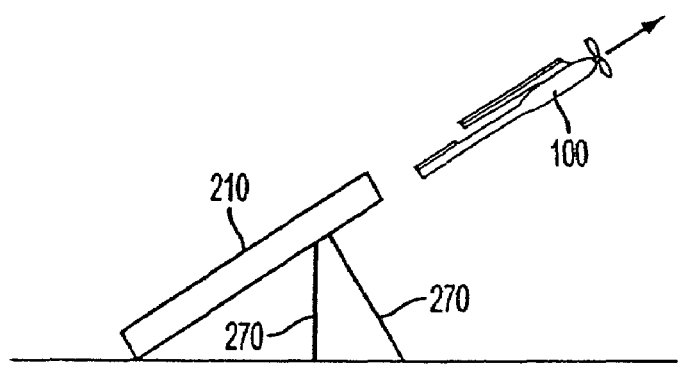
FIG. 8 is a schematic side view of an air vehicle being launched in accordance with the invention.

FIG. 8 shows the air vehicle 100 after being launched from tube 210. This embodiment is provided with two legs 270 positionable against tube 210 in a stored position and deployable to the position shown in FIG. 8. Legs 270 are preferably adjustable to compensate for different terrain at the launch site.

Figure 9:
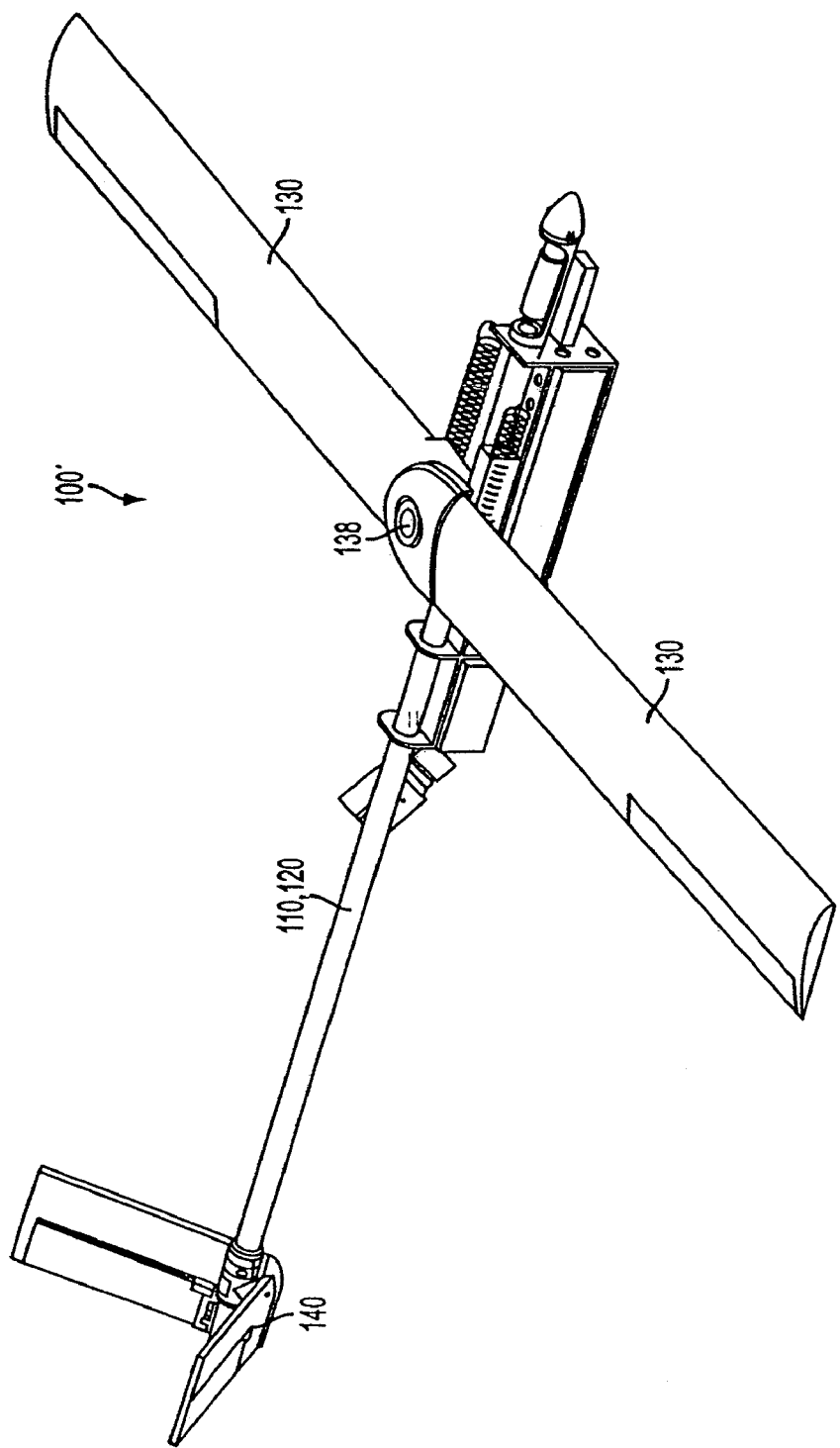
FIG. 9 is a perspective view of an example of an air vehicle in accordance with the invention.

FIG. 9 is a perspective view of an air vehicle 100' in accordance with the invention. In this figure, air vehicle 100' is shown in the flying, unfolded state. Wings 130 pivot about shaft 138 from the closed (storage and launch) position to the open (flight) position under the force of springs or other urging devices. Tail 140 also moves from a folded (storage and launch) position to a open (flight) position after leaving tube 210 of launcher 200.

Figure 10:
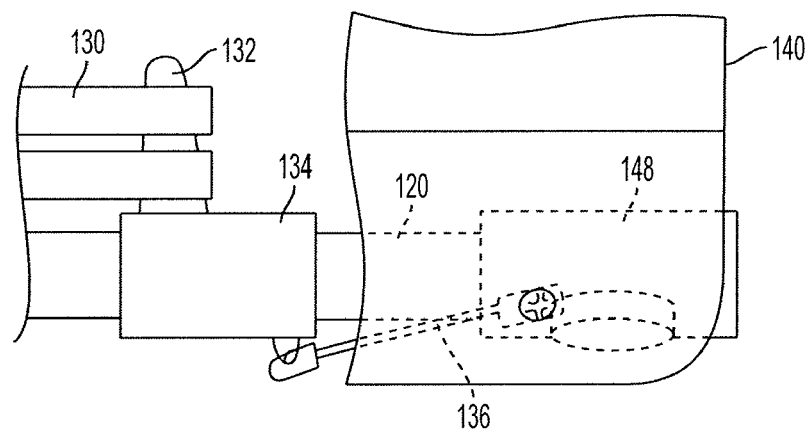
FIG. 10 is a side view of a wing deployment mechanism in accordance with the invention.
Figure 11:
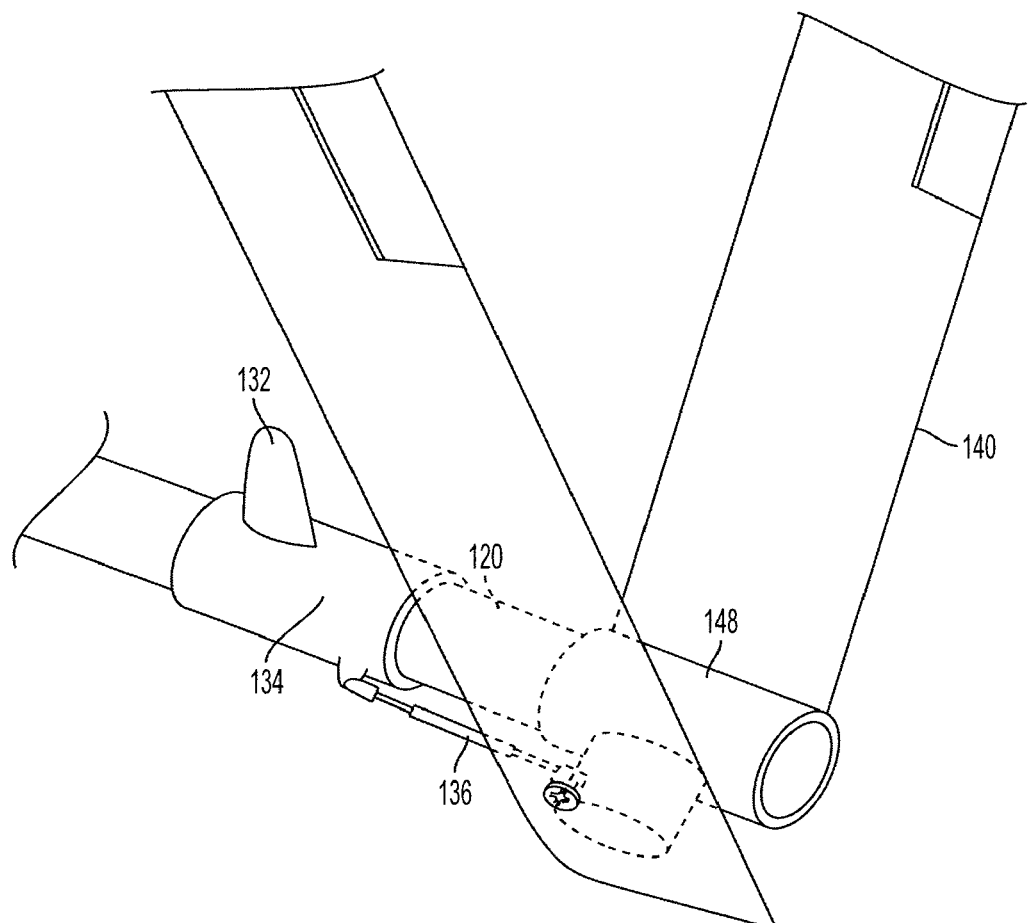
FIG. 11 is a perspective view of the mechanism shown in FIG. 10.

FIGS. 10 and 11 show an example of a mechanism that links the opening of tail 140 and wings 130. In this example, a linkage 136 connects a tail plug 148 to a slider 134 that is provided with a wing knife 132 that engages wings 130 in the closed position. Upon tail 140 opening, tail plug 148 slides relative to fuselage 120 and, through linkage 136, moves slider 134 along fuselage 120. As a result, wing knife 132 moves relative to wings 130 and disengages from wings 130 allowing wings 130 to open under the force of, for example, springs.

Figure 12:
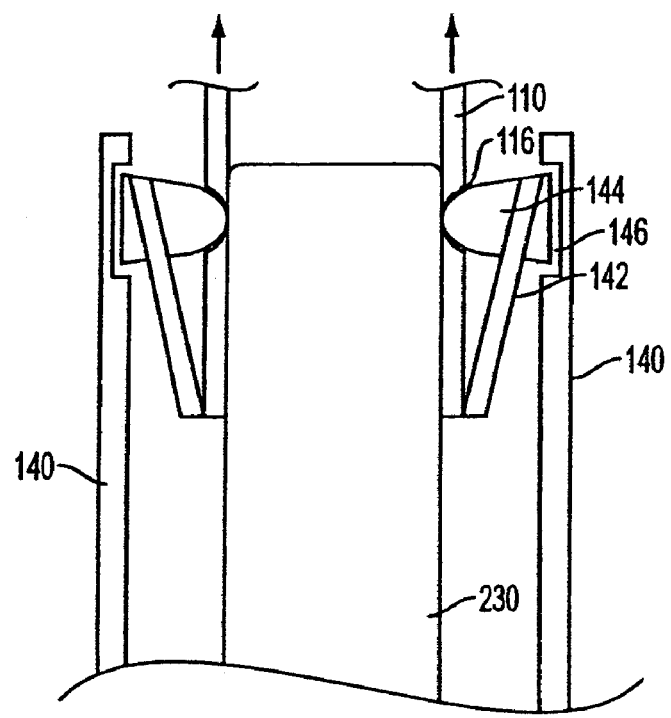
FIG. 12 is a partial view of an example of a tail deployment mechanism in accordance with the invention.

FIG. 12 shows an example of a tail release mechanism. In FIG. 12, air vehicle 100 is being launched and pressure tube 110 is about to clear launch tube 230. Tail 140 (two tail fins are shown in this view) is held in the closed position by at least one cam 144 that engage a lock recess 146 in at least one of the fins of tail 140. A spring 142 attempts to push cam 144 into a cam recess 116 in the wall of pressure tube 110. In the position shown in FIG. 12, the progress of cam 144 through cam recess 116 is prevented by the presence of launch tube 230. As pressure tube 110 continues upward in FIG. 12 as the launch progresses, pressure tube 110 clears launch tube 230 and launch tube 230 no longer prevents cams 144 from progressing through cam recesses 116 under the force of springs 142. As cams 144 progress through cam recesses 116, cams 144 disengage from lock recesses 146 and allow the fins of tail 140 to move to the open position under spring, or other, force.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention.

The embodiments illustrated and discussed in this specification are intended only to teach those skilled in the art the best way known to the inventors to make and use the invention. Nothing in this specification should be considered as limiting the scope of the invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

We claim:

1. A foldable unmanned air vehicle, comprising:
    a fuselage having a pressure tube portion for receiving a launch tube of a pneumatic launcher;
    two wings, each wing being pivotably connected to the fuselage such that it pivots about a pivot point;
    a wing retention mechanism that holds the wings in a folded position;
    a foldable tail connected to the fuselage;
    a tail retention mechanism that holds the tail in a folded position; and
    a linkage that links the wing retention mechanism to the tail retention mechanism such that release of the tail retention mechanism releases the wing retention mechanism.

2. The air vehicle of claim 1, wherein the air vehicle is configured for launching from a containment tube with the wings and the tail in their folded positions.

3. The air vehicle of claim 2, wherein the tail retention mechanism comprises a trigger for triggering the release of the tail retention mechanism when the air vehicle exits the containment tube.

4. The air vehicle of claim 3, wherein the trigger for triggering the release of the tail retention mechanism comprises spring loaded cams for pressing against the launch tube through holes in the pressure tube,
    wherein the spring loaded cams are released from engagement with the tail when the launch tube is removed from the pressure tube.

* * * * *